(12) United States Patent
Dean-Bhïyan et al.

(10) Patent No.: US 10,904,686 B2
(45) Date of Patent: *Jan. 26, 2021

(54) METHOD OF ACOUSTIC TUNING IN AIRCRAFT CABIN

(71) Applicant: MITSUBISHI HEAVY INDUSTRIES, LTD., Tokyo (JP)

(72) Inventors: Sasha Dean-Bhïyan, Aichi (JP); Renato Seiji Morita, Aichi (JP); Victor-Daniel Gheorghian, Aichi (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/503,028

(22) Filed: Jul. 3, 2019

(65) Prior Publication Data

US 2020/0314573 A1 Oct. 1, 2020

Related U.S. Application Data

(60) Provisional application No. 62/826,197, filed on Mar. 29, 2019.

(51) Int. Cl.
*H04R 29/00* (2006.01)
*H04S 7/00* (2006.01)
*H04R 27/00* (2006.01)
*B64C 1/40* (2006.01)

(52) U.S. Cl.
CPC ......... *H04R 29/007* (2013.01); *H04R 29/005* (2013.01); *H04S 7/302* (2013.01); *B64C 1/40* (2013.01); *H04R 27/00* (2013.01)

(58) Field of Classification Search
CPC .......... H04R 2499/13; H04R 1/1083; G10K 11/178; G10K 2210/1282; G10K 2210/3055
USPC ............................ 381/71.4, 86, 82
See application file for complete search history.

(56) References Cited

U.S. PATENT DOCUMENTS

| | | | | |
|---|---|---|---|---|
| 5,426,703 A | * | 6/1995 | Hamabe | G10K 11/178 381/71.12 |
| 2015/0192426 A1 | * | 7/2015 | Foster | G01C 21/3641 715/765 |
| 2015/0223002 A1 | * | 8/2015 | Mehta | H04S 7/30 381/303 |

(Continued)

*Primary Examiner* — Alexander Krzystan
(74) *Attorney, Agent, or Firm* — Osha Bergman Watanabe & Burton LLP

(57) ABSTRACT

A method of acoustic tuning includes: outputting, with a first speaker among a plurality of speakers in different locations on an aircraft cabin, a first sound; detecting, with a plurality of microphones in different locations of the cabin, first reflected sounds of the first sound; outputting, with a second speaker among the plurality of speakers, a second sound; detecting, with the plurality of microphones, second reflected sounds of the second sound; comparing, with a server connected to the speakers and the microphones, the first sound and the second sound with each of the first reflected sounds and each of the second reflected sounds, respectively; and adjusting an output gain and frequency phase of each of the plurality of speakers based on the comparisons between the first sound and each of the first reflected sounds and between the second sound and each of the second reflected sounds.

12 Claims, 13 Drawing Sheets

(56) References Cited

U.S. PATENT DOCUMENTS

2016/0379618 A1* 12/2016 Torres .................. G10K 11/178
                                                     381/71.4
2019/0045319 A1*  2/2019 Hotary ................ G06K 9/00832
2019/0281149 A1*  9/2019 Every ................. H04M 1/6091

* cited by examiner

| MDU | Zone | Location | Reflection Characteristics |
|---|---|---|---|
| $MDU_1$ | FWD | FWD Entrance | ... |
| $MDU_2$ | FWD LH | ROW 1LH | ... |
| $MDU_3$ | FWD LH | ROW 2LH | ... |
| $MDU_4$ | FWD LH | ROW 3LH | ... |
|  |  |  |  |
| $MDU_N$ | AFT | AFT Lavatory | ... |
| ... |  |  | ... |

FIG. 13

| Speaker (MDU) | Calculated Output Gain | Flight Phase |
|---|---|---|
| $MDU_1$ | ... dB | Aircraft Taxi |
| $MDU_2$ | ... dB | Aircraft Taxi |
| ... | ... | ... |
| $MDU_N$ | ... dB | Aircraft Taxi |
| $MDU_1$ | ... dB | Take-Off |
| $MDU_2$ | ... dB | Take-Off |
| ... | ... | ... |
| $MDU_N$ | ... dB | Take-Off |
| ... | ... | ... |

METHOD OF ACOUSTIC TUNING IN AIRCRAFT CABIN

BACKGROUND

Technical Field

The present invention generally relates to a method of acoustic tuning in an aircraft cabin system.

Description of Related Art

Public Address (PA) systems in an aircraft need to provide passengers with clearly audible instructions during normal and emergency operations. Intelligibility of audio of the PA system depends on various factors. For example, the location of PA speakers in the cabin and the cabin layout may affect the intelligibility of the audio. Other factors such as signal-to-noise ratio, sound pressure level, ambient noise level in the cabin, reverberation time, and psychoacoustic masking effects (e.g., when the announcement is masked by louder sounds such as engine noise) may also affect the intelligibility.

To obtain certification for the intelligibility of the audio of the PA system, an aircraft Original Equipment Manufacturer (OEM) may perform qualitative acoustic tuning of the PA system to compensate for the aforementioned factors. A conventional method of acoustic tuning in the PA system commonly requires a trained acoustic engineer with special instrumentation to manually perform various tests in various locations throughout the cabin during different phases of flight in order to establish an acceptable articulation index. Once the required articulation index is achieved, the aircraft OEM typically sends the data to the supplier of the PA system to implement it in the "certification-approved" Line Replaceable Unit (LRU) of the PA system. The test LRU in the aircraft (the one used to perform the manual tuning) is then replaced with the "certification-approved" LRU.

Then, the aircraft OEM demonstrates the intelligibility of the audio in compliance with the required certification regulations. This demonstration involves outputting various live voice announcements through the PA speakers during various phases of flight, and subjectively measuring the quality of the announcements at predefined measurement positions. This subjective assessment depends largely on accuracy of the initial manual acoustic tuning.

The manual acoustic tuning of the PA system is typically performed by a trained acoustic engineer on the aircraft both on the ground and in flight using special instrumentation. This activity requires also support from the supplier of the PA system. The conclusion is that the acoustic tuning in the PA system is performed manually using time-consuming and elaborate setups, requiring special instrumentation and trained acoustic engineers.

SUMMARY

One or more embodiments of the present invention provide a method of acoustic tuning in an aircraft cabin. The method of acoustic tuning includes: outputting, with a first speaker among a plurality of speakers in different locations on an aircraft cabin, a first sound; detecting, with a plurality of microphones in different locations of the cabin, first reflected sounds of the first sound; outputting, with a second speaker among the plurality of speakers, a second sound; detecting, with the plurality of microphones, second reflected sounds of the second sound; comparing, with a server connected to the speakers and the microphones, the first sound and the second sound with each of the first reflected sounds and each of the second reflected sounds, respectively; and adjusting an output gain and frequency phase of each of the plurality of speakers based on the comparisons between the first sound and each of the first reflected sounds and between the second sound and each of the second reflected sounds.

BRIEF DESCRIPTION OF DRAWINGS

FIG. 8 shows a database including data of optimal sounds associated with data of reflected sounds according to one or more embodiments.

FIG. 9 shows a baseline sound map according to one or more embodiments.

FIG. 13 shows a speaker output gain map according to one or more embodiments.

DETAILED DESCRIPTION

Figure 1:
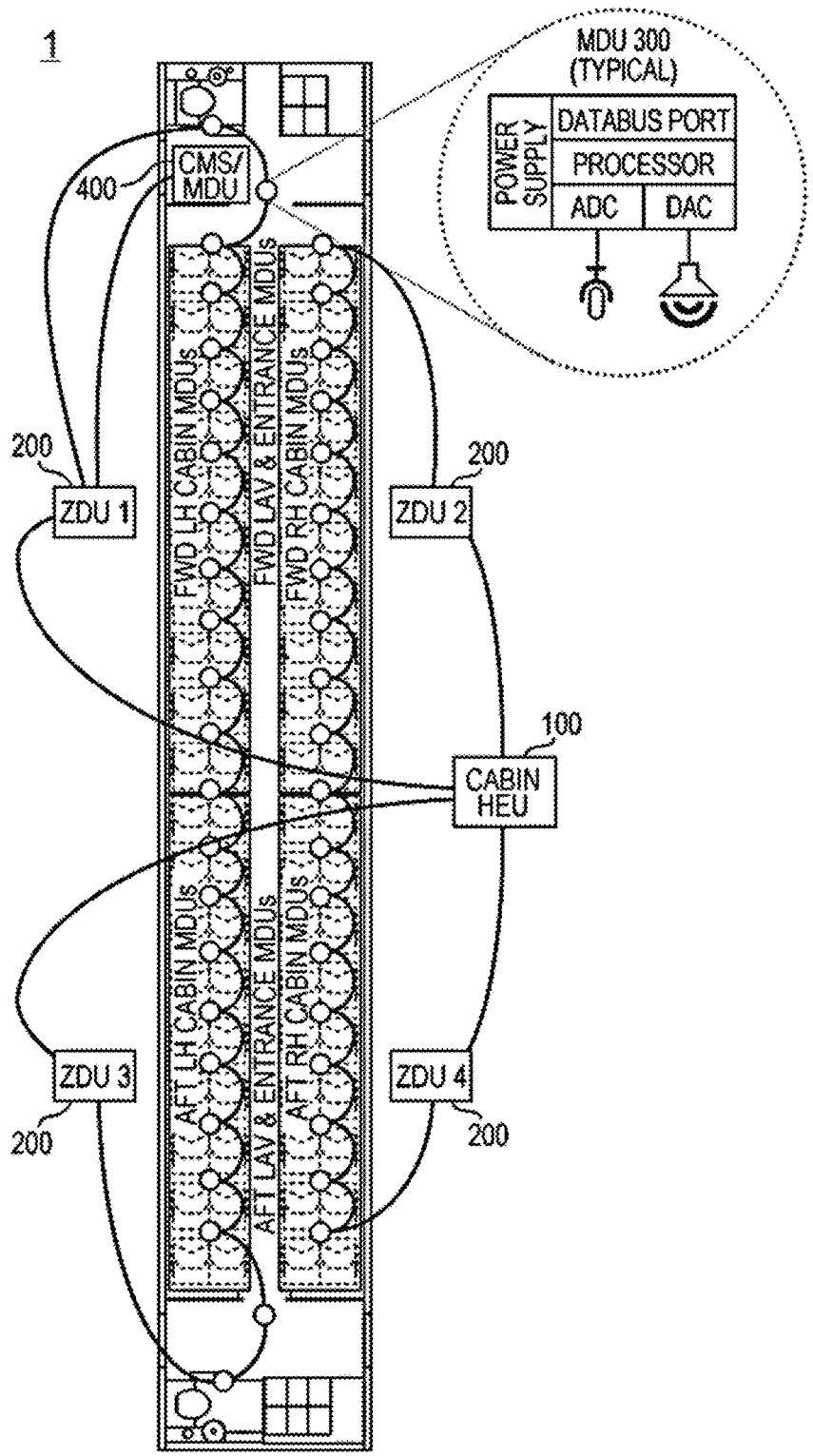
FIG. 1 shows a schematic view of a cabin system according to one or more embodiments of the present invention.

Embodiments of the present invention will be described in detail below with reference to the drawings. Like elements in the various figures are denoted by like reference numerals for consistency.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

As will become apparent from the following description, one or more embodiments of the invention can eliminate the need for manual acoustic tuning of a PA system and potential human errors associated therewith, thereby improving the intelligibility of the PA system. Further, according to one or more embodiments, a "certification-approved" LRU may be achieved without OEM-supplier interaction. As a result, one or more embodiments of the invention can reduce the overall engineering time and effort required to achieve an acceptable articulation index needed for certification of audio intelligibility of the PA system. One or more embodiments of the invention are also applicable to a wide variety of cabin environments and can provide an automated means to calibrate the cabin audio system's speaker outputs to achieve the required articulation index.

As mentioned above, one or more embodiments of the invention can be employed on any other suitable cabin environment such as a train or a ship, but for purposes of illustration the embodiments are described with respect to an aircraft.

Figure 2:
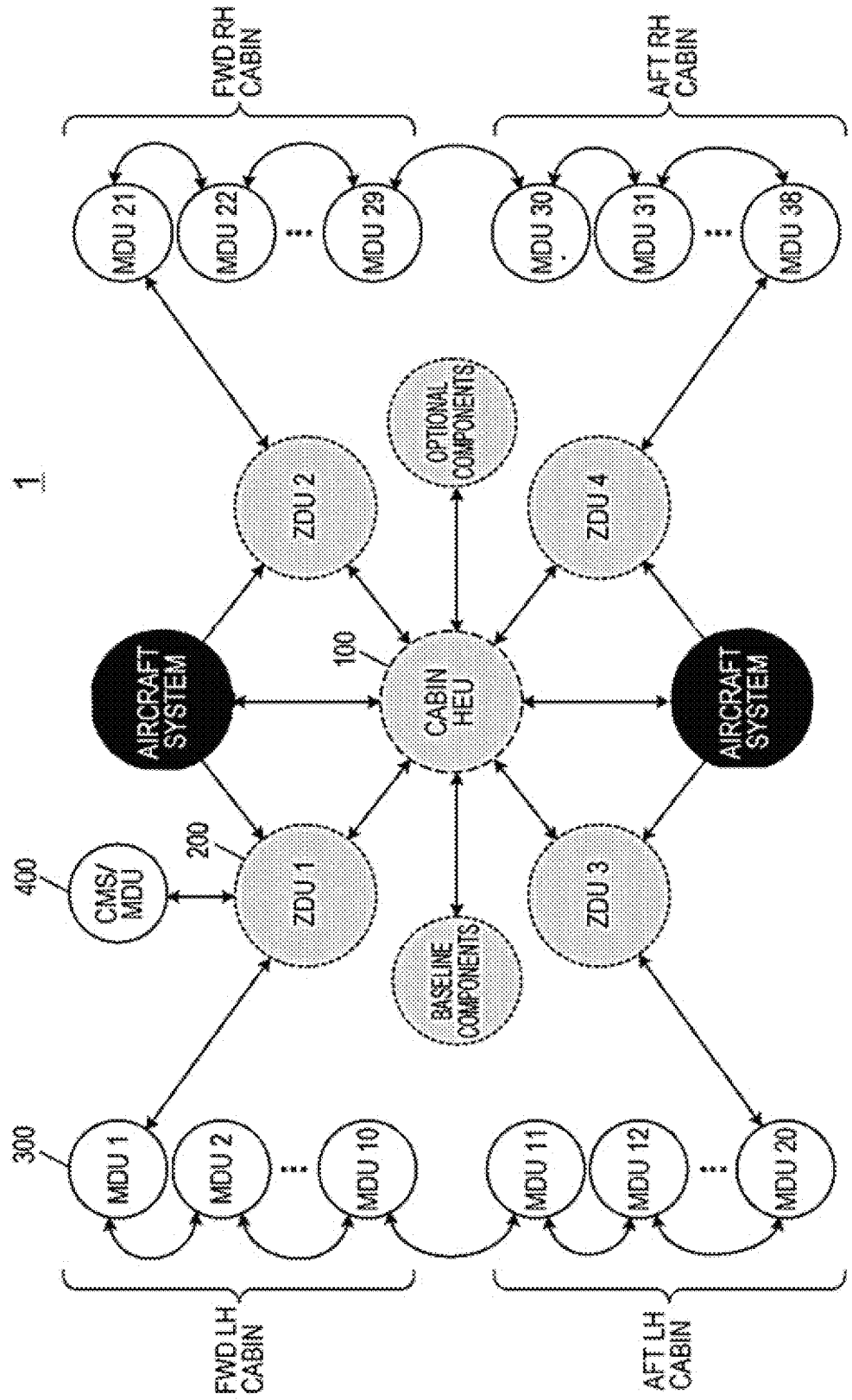
FIG. 2 shows an overall architecture of the aircraft cabin system according to one or more embodiments.

FIG. 1 shows a schematic view of a cabin system according to one or more embodiments. FIG. 2 shows an overall architecture of the aircraft cabin system according to one or more embodiments.

As shown in FIGS. 1 and 2, the cabin system 1 includes a head end unit (HEU) 100, cabin zone distribution units (ZDUs) 200, modular display units (MDUs) 300, and a cabin management system (CMS) terminal 400 having cabin management system functions. In one or more embodiments, the CMS terminal 400 may be a type of MDU. The HEU 100, ZDUs 200, MDUs 300, and CMS terminal 400 are electrically connected to one another. Each of the MDUs 300 may include at least a microphone and a speaker.

In one or more embodiments, the HEU 100 is a server of the cabin system 1 and stores various data and software applications to be distributed via the ZDUs 200 to the MDUs 300 and the CMS 400.

In one or more embodiments, the ZDUs 200 function as network hubs of the cabin system 1. The ZDUs 200 switch and control power supply among the HEU 100, MDUs 300, and CMS terminal 400. The ZDUs 200 also deliver data and software applications from the HEU 100 to the MDUs 300 and the CMS 400.

In one or more embodiments, the MDUs 300 are interchangeable equipment components of the cabin system 1. Each of the MDUs 300 may comprise a dock hardwired to the network of the cabin system 1 and a display (body) that detachably couples to the dock.

In one or more embodiments, the MDUs 300, CMS terminal 400, and ZDUs 200 may communicate with each other through various means, e.g., with twisted pair Ethernet using multipath routing compliant with IEEE 802.1aq and Ethernet over twisted pair compliant with IEEE 802.3bp and IEEE 802.3bw standards.

In one or more embodiments, various types or models of MDUs (including the MDUs 300, CMS terminal 400, and other MDUs) may be used in the aircraft cabin. The MDUs 300, the CMS terminal 400, and other MDUs may have different sizes and functions, and may be installed at different locations from one another. For example, in one or more embodiments, the CMS terminal 400 may be installed at a cabin station, while other MDUs may be installed in a cockpit or seatback. Further, in one or more embodiments, the CMS terminal 400 may be larger than all other MDUs, while each of the MDUs 300 may be smaller than the CMS terminal 400 as well as other MDUs. Other variations in size, location, and function among the MDUs are possible without deviating from the scope of the invention.

As shown in FIG. 1, the MDUs 300 are installed: between two passenger seats; at front (FWD) and rear (AFT) entrance areas; and at front (FWD) and rear (AFT) lavatories. In this example, the cabin is divided into four zones: front left (FWD LH); front right (FWD RH); rear left (AFT LH); and rear right (AFT RH) zones. One cabin ZDU 200 per zone receives the data and software applications from the HEU 100. Then, the four cabin ZDUs 200 distribute them to the MDUs 300 at the front and the back in the right and left rows, respectively, directly or via the MDUs 300 installed at the FWD and AFT entrance areas and lavatories. The MDUs in each row may be electrically connected via a single data bus. The number of seats, the number of cabin ZDUs 200, the type of data bus, the manner the MDUs 300 are connected with the ZDUs 200 and the manner in which the cabin is divided are not limited to these illustrated embodiments.

Next, the HEU 100 according to one or more embodiments will be described.

In one or more embodiments, the HEU 100 comprises a modular cabinet with Line Replaceable Modules (LRMs), which may be a circuit card or daughter board loaded with various electrical and electronic components to execute control, sensing, and/or a recording function. The cabinet may also comprise a plurality of dedicated slots into which the LRMs are inserted, respectively.

Figure 3:
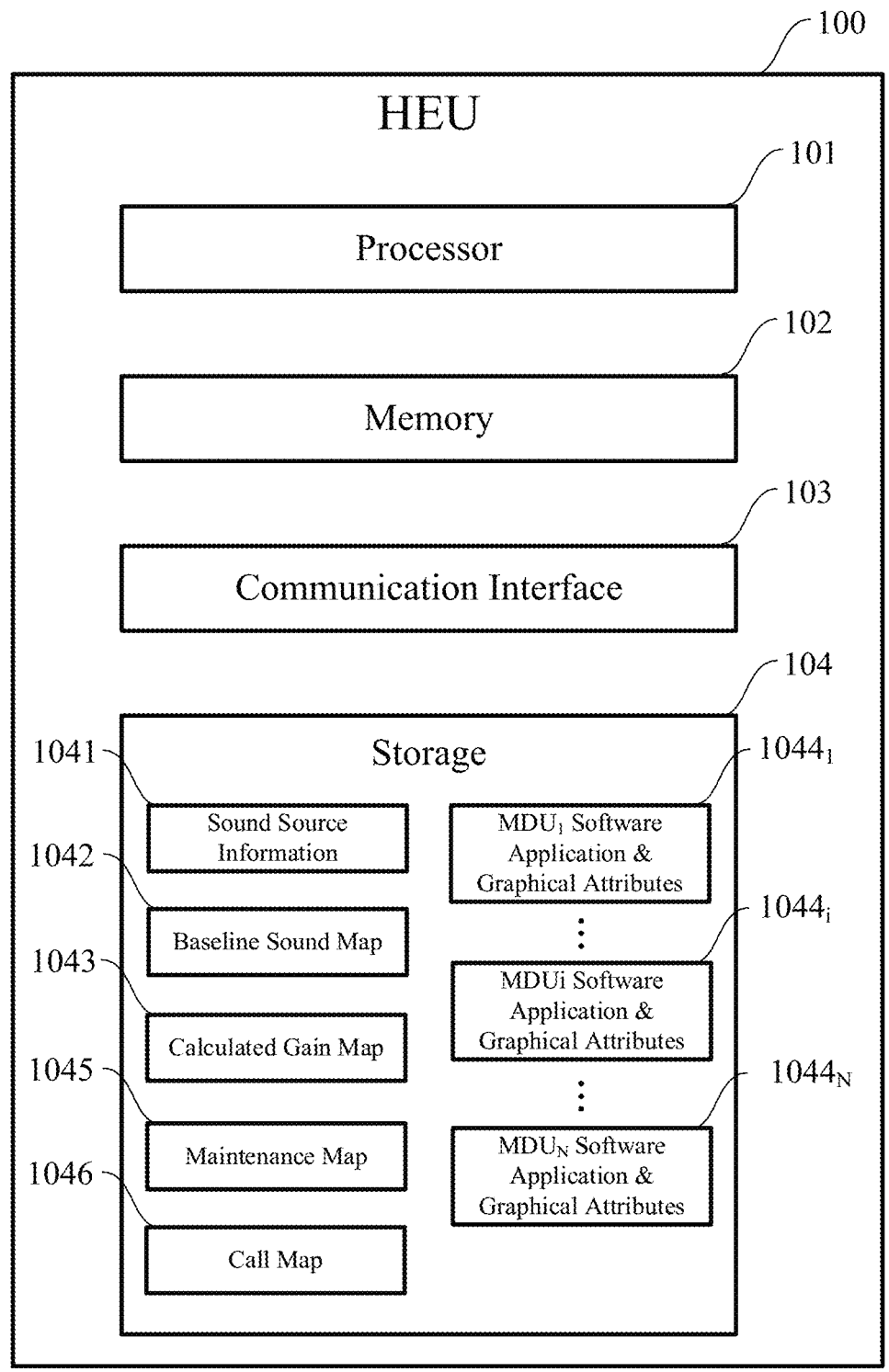
FIG. 3 shows a hardware configuration of a head end unit (HEU) according to one or more embodiments.

FIG. 3 shows a hardware configuration of the HEU 100 according to one or more embodiments. The HEU 100 comprises a processor 101, a memory 102, a communication interface 103, a storage 104. The storage 104 includes sound source information 1041, a baseline sound map 1042, a calculated gain map 1043, MDU software applications and graphical attributes 1044, a maintenance map 1045, and a call map 1046.

In one or more embodiments, the processor 101 works in conjunction with the memory 102 and communicates with all the other elements of the network through the communication interface 103; henceforth, the processor 101 implies all three: the processor 101, the memory 102 and the communication interface 103.

In one or more embodiments, in response to a request from the MDUs 300, the processor 101 transmits, from the storage 104, configuration data for each of the MDUs 300. The configuration data for each of the MDU $300_N$ may be MDU software applications and graphical attributes $1044_N$ relevant to the dock ID of the respective MDUs $300_N$. The MDUs 300 may request the MDU software applications and graphical attributes 1044 from the HEU 100 when the MDUs 300 are newly installed at a certain location. The MDU software applications and graphical attributes allow users to control the functions of the MDUs 300 and to view indications and contents specific to the locations of the MDUs 300 when powered on.

In one or more embodiments, the applications include at least a first application for performing user controllable functions and a second application for performing user non-controllable functions. The user controllable functions include reading lights, flight attendant call, and reset, etc. that are controllable by passengers and cabin crew. The user non-controllable functions include, among other things, a moving map, a fasten-seat-belt (FSB) or return-to-seat (RTS) sign, a lavatory-occupied (LO) sign, a no-smoking (NS) sign, a cabin interphone call indication, a brightness control, a white balance control, etc. that can merely be displayed/shown on the screen 3111 but not controlled by passengers or cabin crew.

The processor 101 also monitors the MDUs 300 to detect non-responsive MDU 300 or any internal failure (e.g., broken subparts such as a light, speaker, display, sensors, camera, etc.) in the MDUs 300. When detecting non-responsive or failed MDU(s) 300, the location of such MDU(s) 300 is shown on a maintenance map 1045 sent by the processor 101 to the CMS terminal 400.

The sound source information 1041, the baseline sound map 1042, and the speaker output gain map 1043 stored in the storage 104 will be described in detail below.

In one or more embodiments, the sound source information 1041 is used to generate an amplitude-ramped and frequency-ramped sound to be output to the speaker 3106 of the MDUs 300; wherein a ramp may be a continuous change in the parameter of interest, e.g., the amplitude or the frequency output by HEU 100. With frequency, a continuous ramp may be referred to as a "chirp." In one or more embodiments, a ramp may be stepwise where a particular value is maintained for an amount of time.

In one or more embodiments, the baseline sound map 1042 is created by gathering information related to the reflected sounds captured by the microphones 3105 of all the MDUs 300 in the first step of the audio tuning process.

In one or more embodiments, the calculated gain map 1043 is created by gathering the information related to the specific gains for each one of the speakers 3106 of the MDUs 300 as result of the second step of the audio tuning process.

In one or more embodiments, the HEU 100 communicates, using communication interface 103, with the network including the MDUs 300 and the CMS 400 via the cabin ZDUs 200.

Next, the cabin ZDUs 200 according to one or more embodiments will be described. The cabin ZDUs 200 function as backbone network switches of the cabin system 1. As shown in FIG. 2, the ZDUs 200 provide the communication between the HEU 100 and the MDUs 300 and the CMS terminal 400. The cabin ZDUs 200 also control the power supply to the MDUs 300, and CMS terminal 400. Through this power control, essential cabin equipment components may be segregated from non-essential cabin equipment components to ensure compliance with safety and airworthiness regulations.

Next, the MDUs 300 according to one or more embodiments will be described. The MDUs 300 are clients of the cabin system 1. They are flexible and interchangeable equipment components that provide various information and cabin functions to passengers and cabin crew, henceforth identified as users.

Figure 4:
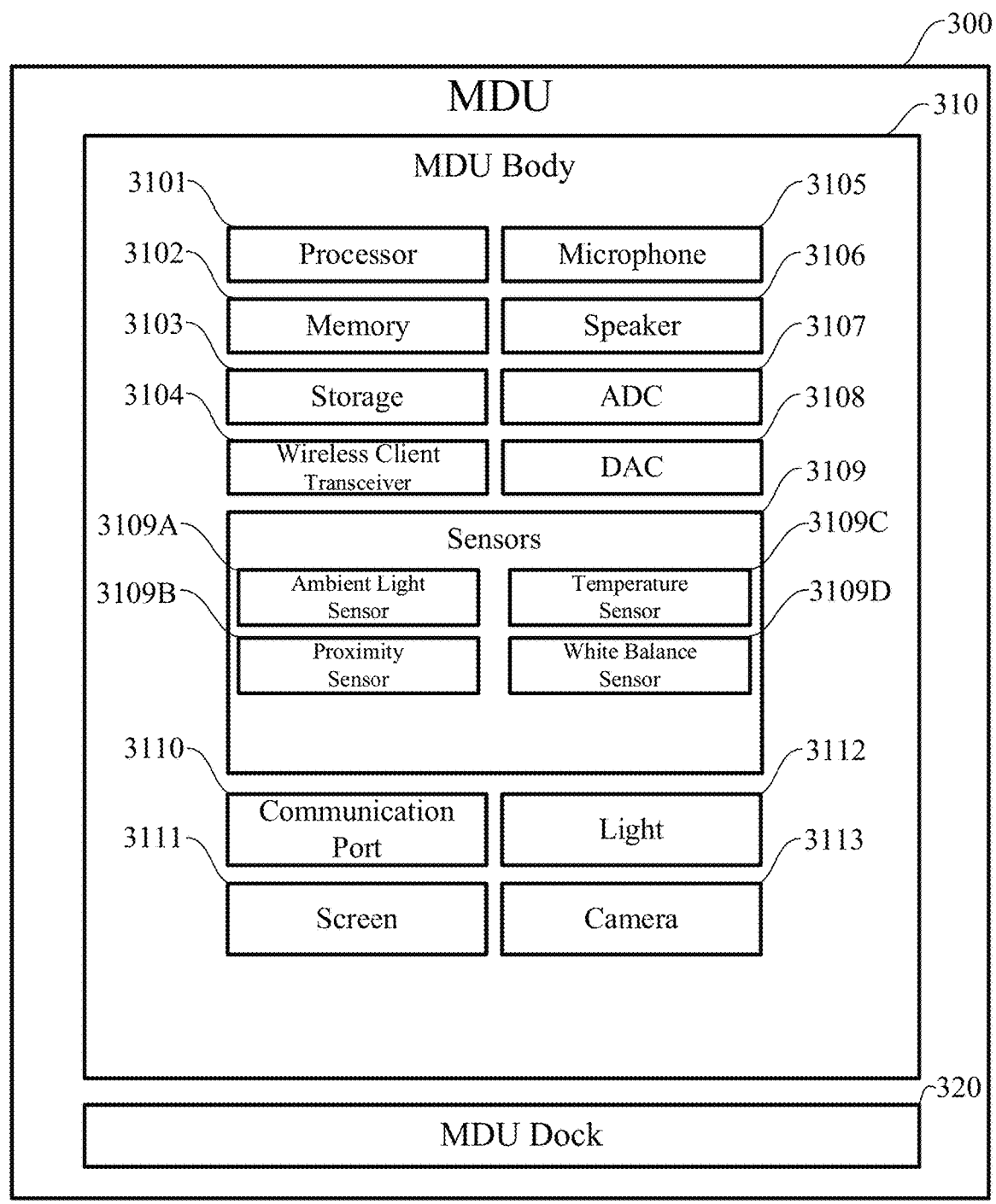
FIG. 4 shows a hardware configuration of a modular display unit (MDU) according to one or more embodiments.

FIG. 4 shows a hardware configuration of the MDU 300 according to one or more embodiments. As illustrated in FIG. 4, each MDU 300 comprises the MDU body 310 and the MDU dock 320. The MDU body 310 may be a lightweight touch screen device that detachably couples to any mating MDU dock 320. For example, in one or more embodiments, the MDU body 310 can couple to the MDU dock 320 that has a size matching with that of the MDU body 310.

The MDU body 310 according to one or more embodiments comprises: a processor 3101; memory 3102; storage 3103; wireless client transceiver 3104; microphone 3105; speaker 3106; Analog-to-Digital Converter (ADC) 3107; Digital-to-Analog Converter (DAC) 3108; sensors 3109; communication port 3110; screen 3111; light 3112 such as an LED light; and camera 3113 such as an Ultra High-Definition (UHD) camera.

The processor 3101 may be referred to as a Central Processing Unit (CPU). When the MDU body 310 is coupled to the mating MDU dock 320 and powered on, the processor 3101 requests the HEU 100 to send the configuration data specific to its location (based upon the MDU dock 320 unique ID strapping). Upon receiving the configuration data, the processor 3101 installs it in the storage 3103, and executes processes and applications instructed by the configuration data. For example, the processor 3101 retrieves the Graphical User Interface (GUI) from the storage 3103 and displays it on the screen 3111.

The memory 3102 according to one or more embodiments comprises a nonvolatile memory including a Random Access Memory (RAM) and a Read Only Memory (ROM). The memory 3102 provides a workspace that temporarily stores data used by the processor 3101.

The storage 3103 according to one or more embodiments may store the applications and graphical attributes relevant to the dock ID, which are received from the HEU 100 via the cabin ZDU 200.

The wireless client transceiver 3104 according to one or more embodiments comprises wirelessly receives/transmits signals from/to remote units/devices/terminals in the cabin system 1. In one or more embodiments, the Wi-Fi transceiver may connect to the Internet.

The microphone 3105 detects the ambient sound in the aircraft cabin and converts it to an electrical sound signal that is sent to the ADC 3107. The ADC 3107 converts the electrical sound signal to digital sound signals such as Ethernet digital signals.

The DAC 3108 converts the digital sound signals to analog sound signals. The speaker 3106 outputs sound based on the analog signals converted by the DAC 3108.

The sensors 3109 according to one or more embodiments comprise: (1) an ambient light sensor 3109A that detects ambient light around the MDU body 310 so that the processor 3101 can automatically control display brightness of the screen 3111 in response to a detected signal transmitted from the ambient sensor; (2) a proximity sensor 3109B that detects a user's hand and its proximity to the screen 3111 so that the processor 3101 can control the display on the screen 3111 in response to a detected signal transmitted from the proximity sensor (e.g., GUI icon(s) gets bigger as the hand approaches the screen 3111); (3) a temperature sensor 3109C that monitors a temperature around the MDU body 310 so that the processor 3101 transmits temperature information to the HEU 100; and (4) a white balance sensor 3109D that senses a color temperature so that the processor 3101 can calibrate the white balance of the screen 3111 and/or the camera 3113.

The communication port 3110 according to one or more embodiments is a power and data communication port wired to the network of the cabin system 1. The communication port 3110 enables the MDU body 310 to communicate through the MDU 320 dock with the ZDU 200.

The screen 3111 according to one or more embodiments is a multi-touch screen device. The screen 3111 displays controllable and non-controllable functions to users in response to commands from the sensors 3109 and the HEU 100, and in response to users touching the icons appearing on the screen 3111.

The MDU dock 320 according to one or more embodiments is hardwired to the cabin system backbone network and to the ZDU 200 power. The MDU dock 320 provides to the MDU body 310 the specific ID for the installed location. In one or more embodiments, the MDU dock 320 provides also a network switch function.

Figure 5:
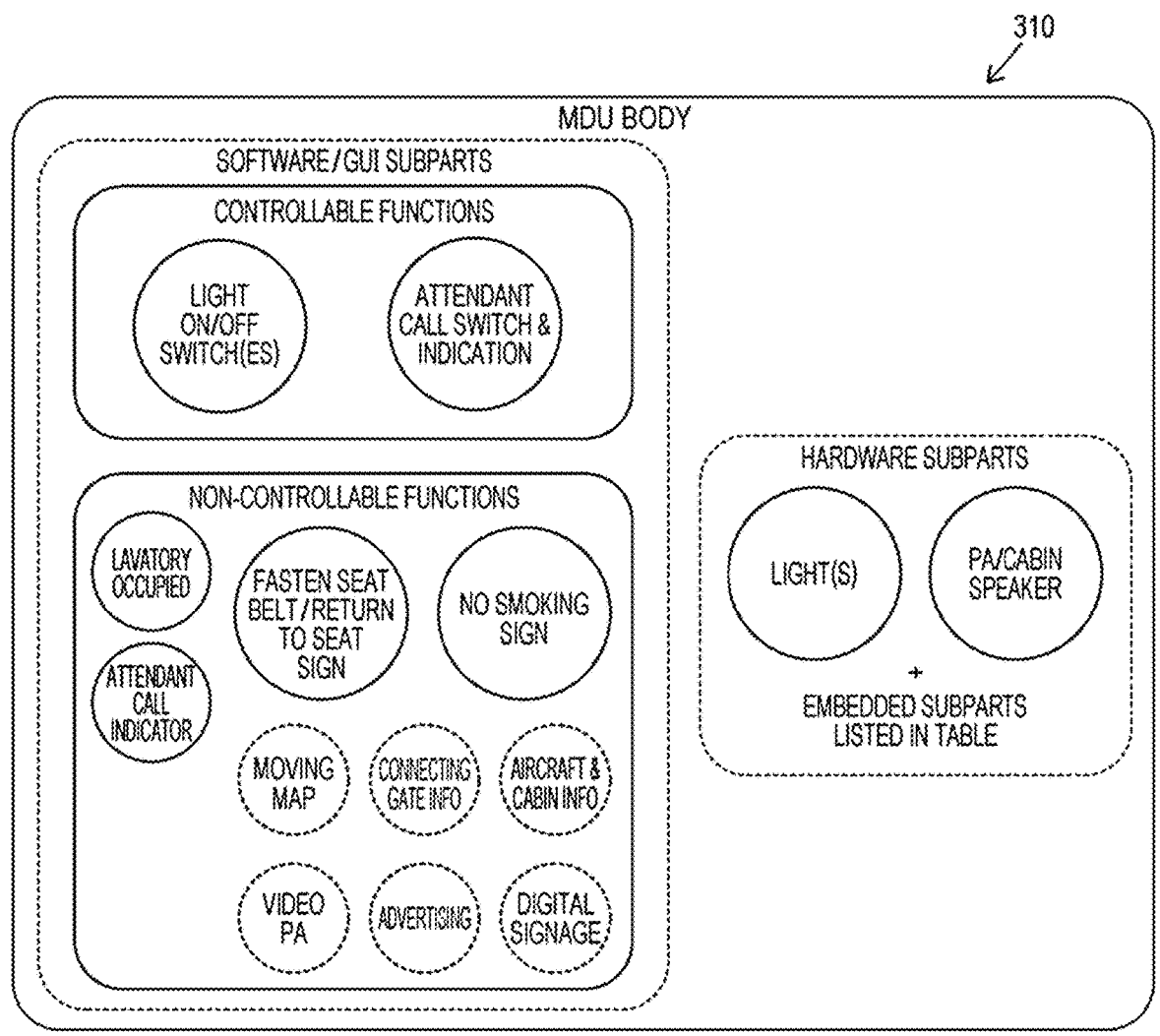
FIG. 5 shows a Graphical User Interface (GUI) with icons appearing on an MDU screen corresponding to software applications installed on an MDU body according to one or more embodiments.

FIG. 5 shows a Graphical User Interface (GUI) with icons appearing on an MDU screen corresponding to software applications installed on the MDU body 310 according to one or more embodiments.

The icons are grouped into two categories: (i) icons of user controllable functions ("CONTROLLABLE FUNCTIONS") and (ii) icons of user non-controllable functions ("NON-CONTROLLABLE FUNCTIONS").

The MDU 300 user controllable functions include, e.g., turning on/off and dimming the reading light 3112, and calling a flight attendant with an icon on the screen 3111. The user controllable functions also include, e.g., resetting an active call from a passenger. In one or more embodiments, if a passenger touches the flight attendant call icon on the screen 3111 the processor 3101 sends a call signal to the HEU 100 and displays the attendant call indicator icon. The HEU processor 101 receives the message and sends to the CMS terminal 400 the call map 1046 together with the location of the MDU that initiated the call. The flight attendant can reset the call map on the CMS terminal 400 and the attendant call indicator icon on the MDU 300 via the CMS 400 or directly from the MDU 300.

The MDU 300 user non-controllable functions include, e.g., displaying an FSB or RTS sign, an LO sign, a NS sign, and a cabin interphone call indication on the screen 3111. The user non-controllable functions also include, e.g., allowing a passenger to view and/or hear information such as a moving map, connecting gate information, aircraft and cabin information (e.g., PA announcements from cabin crew, and announcements from flight deck crew), advertising, and digital signage, via the speaker 3106 and/or the screen 3111. Although not illustrated in FIG. 5, the user non-controllable functions also include controlling the subparts of the MDU body 310 in response to a detected signal from the sensors 3109, as described above.

In the cabin system 1, acoustic tuning is performed to establish a required articulation index for an aircraft cabin environment during any phase of flight. According to one or more embodiments, a method of the acoustic tuning may be automated and simplified. The method of the acoustic tuning may measure how sound bounces off various surfaces in the aircraft cabin, and then perform precise acoustic adjustments to the speakers 3106 of the MDUs 300 to ensure that PA and other audio announcements reach the passengers' ears at exactly the right instant and volume.

The method of acoustic tuning according to one or more embodiments includes two steps as follows. First, the baseline sound map 1042 of the MDUs 300 is determined as explained below.

Figure 6:
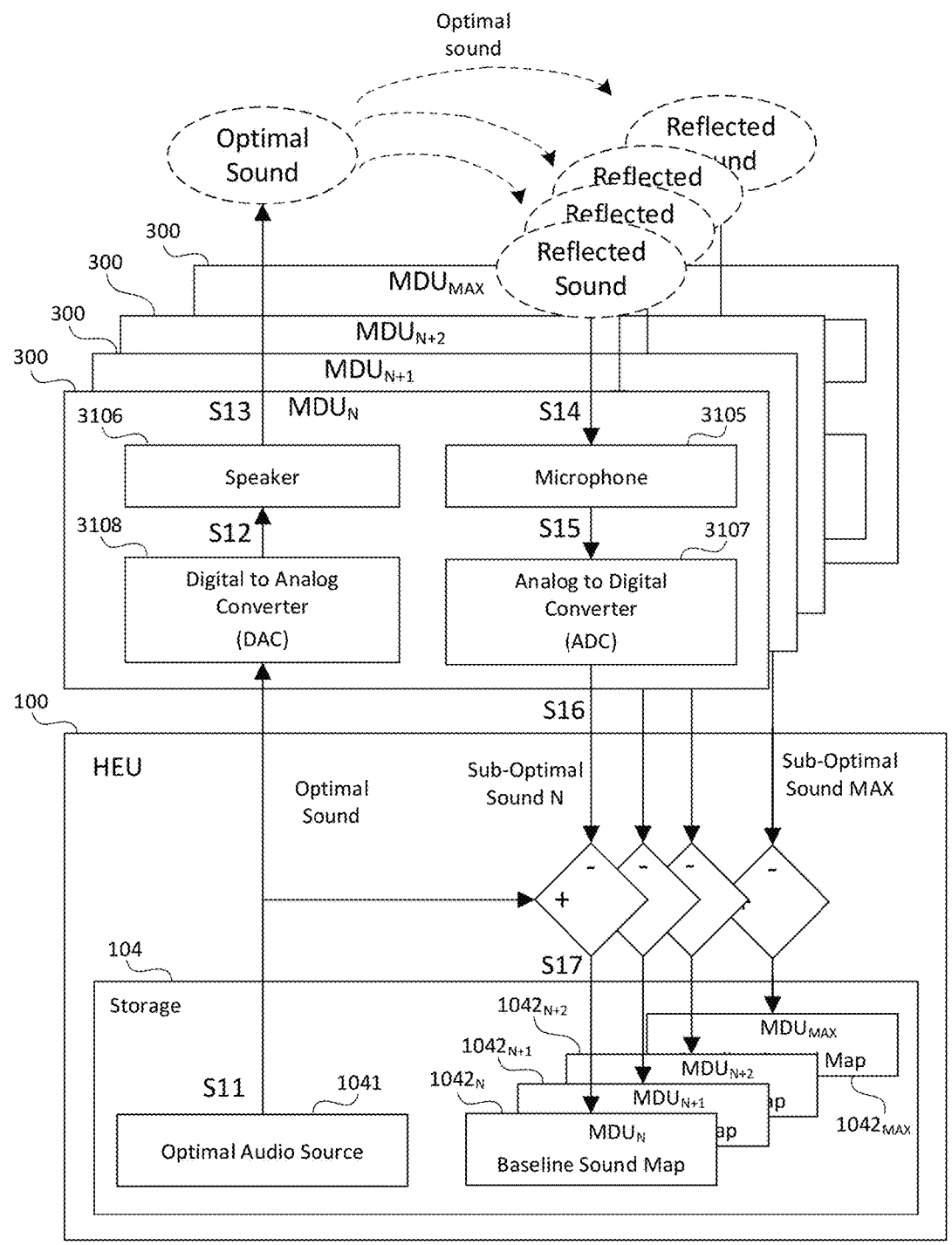
FIG. 6 shows an operations diagram for determining a baseline sound map of the MDUs in the aircraft cabin system according to one or more embodiments.

FIG. 6 shows a general process diagram for determining the baseline sound map for each of the MDUs 300 in the aircraft cabin system 1 according to one or more embodiments. This process is performed sequentially for each one of the MDUs 300 in the aircraft cabin system 1, however, FIG. 6 shows only the steps for a single MDU 300.

At step S11, an optimal audio source indicated in the sound source information 1041 in the storage 104 is retrieved by the processor 101 and sent to the DAC 3108 as a digital optimal sound signal.

The DAC 3108 converts the digital optimal sound signal to an analog optimal sound signal. At step S12, the DAC 3108 outputs the analog optimal sound signal to the speaker 3106.

At step S13, the speaker 3106 converts the electrical signal to an analog optimal sound based on the optimal sound signal received from the HEU 100. The optimal sound may be reflected by obstacles in the aircraft cabin such as walls and seats.

At step S14, the microphones 3105 on all MDUs 300 capture the reflected sound and convert the reflected sound to an electric analog signal. At step S15, the electric analog signal captured by the microphones 3105 is sent to the ADCs 3107.

The ADCs 3107 on all the MDUs 300 convert the analog signal of step S14 into a digital reflected sound signal. At step S16, the ADCs 3107 transmit the digital reflected sound signal to the HEU 100. The digital reflected sound signal may be referred to as a sub-optimal sound.

At step S17, the digital reflected sound signal may be stored in the storage 104. For example, a difference between the digital optimal sound signal and the digital reflected sound signal may be saved in the storage 104, where a baseline sound map 1042 may be created. The baseline sound map 1042 indicates reflection characteristics in the aircraft cabin by comparing the optimal sound with the reflected sound captured by each MDU 300. The baseline sound map 1042 includes the locations of the MDUs 300 and the baseline sounds mapped to their locations. The baseline sounds in the baseline sound map 1042 may be indicated as at least one of a gain and a frequency phase profile between the optimal sound and the reflected sound. The baseline sound map 1042 may also include delay times between the optimal sound and the reflected sounds.

Figure 7:
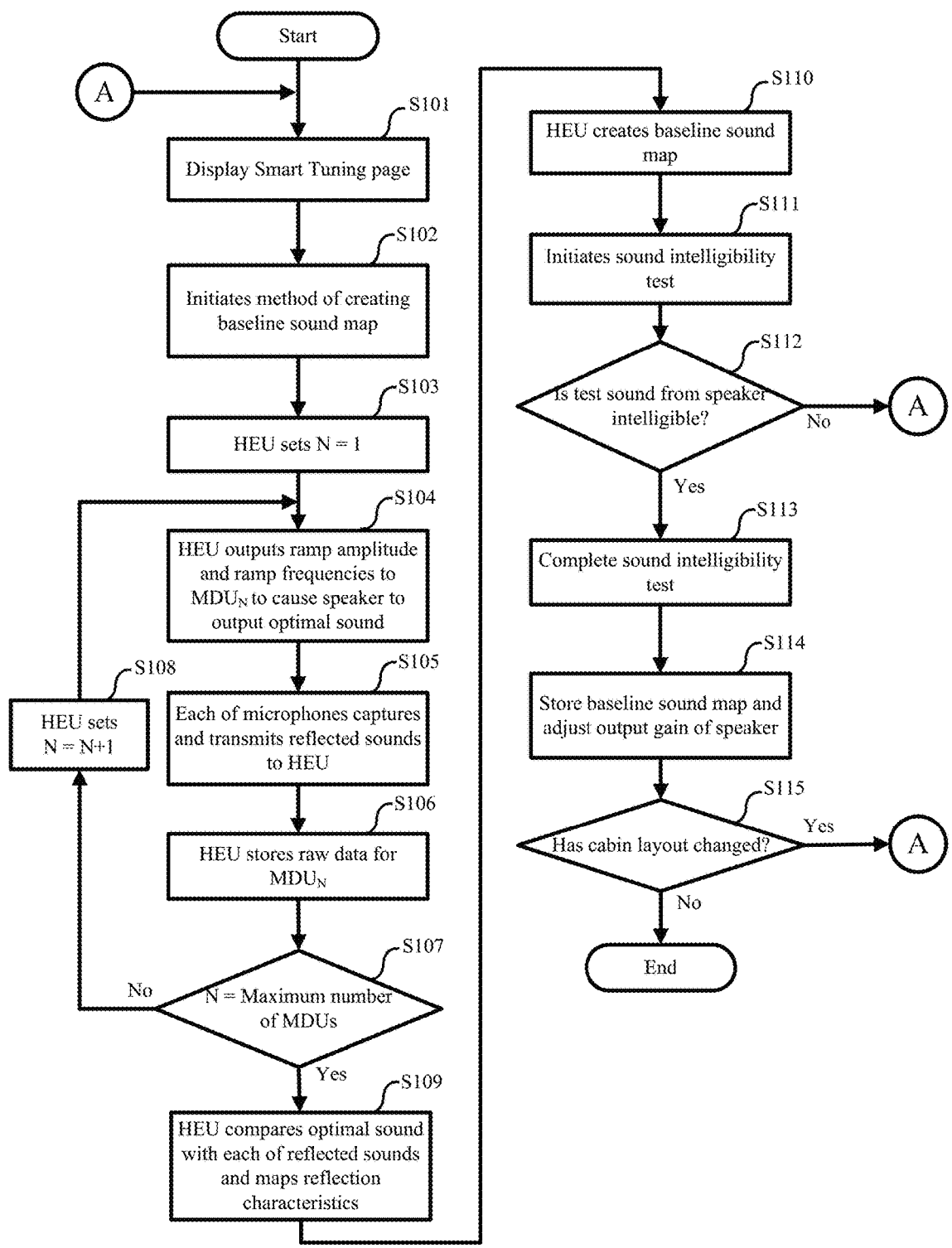
FIG. 7 shows a flowchart of a method for determining a baseline sound map of the MDUs in the aircraft cabin system according to one or more embodiments.

FIG. 7 shows a flowchart of a method for acoustic tuning of the aircraft cabin system 1 according to one or more embodiments.

First, at step S101, the CMS terminal 400 receives an input from a user (e.g., approved personnel with superuser rights) and displays a Smart Tuning page used for generating the baseline sound map 1042.

At step S102, the CMS terminal 400 instructs the HEU 100 to initiate a method of generating the baseline sound map 1042 based on the input from the superuser.

At step S103, the HEU 100 sets N=1, where N is a variable number between 1 and MAX which indicates the MDU 300 which currently receives the optimal sound from the HEU 100.

At step S104, the HEU 100 sends a ramp amplitude and ramp frequencies to the MDUN DAC 3108, which performs the conversion and sends the optimal sound to the MDUN speaker 3106. The MDUN speaker 3106 then outputs the optimal sound in the aircraft cabin.

At step S105, the microphones 3105 of each MDUs 300 capture the reflected sound of the optimal sound. The reflected sound is converted by each ADC 3107 in each MDU 300 and transmitted to the HEU 100. Thus, the microphones 3105 of the MDUs 300 may be considered as being connected using a mesh technology.

At step S106, the HEU 100 stores raw data of the reflected sounds by associating data of the optimal sound output by the MDUN speaker 3106 with the raw data of the reflected sound captured by the microphones 3105 in each one of the MDUs 300.

At step S107, the HEU 100 verifies whether N corresponds to the maximum number of MDUs 300, in others words, it verifies if raw data related to all MDU speakers 3106 installed in the aircraft cabin have been stored in the HEU 100.

If N is not equal to the maximum number of MDUs 300, at step S108, the HEU 100 sets N=N+1. Then, steps S104 to S107 are performed for the next MDU 300 installed in the aircraft cabin.

Figure 8:
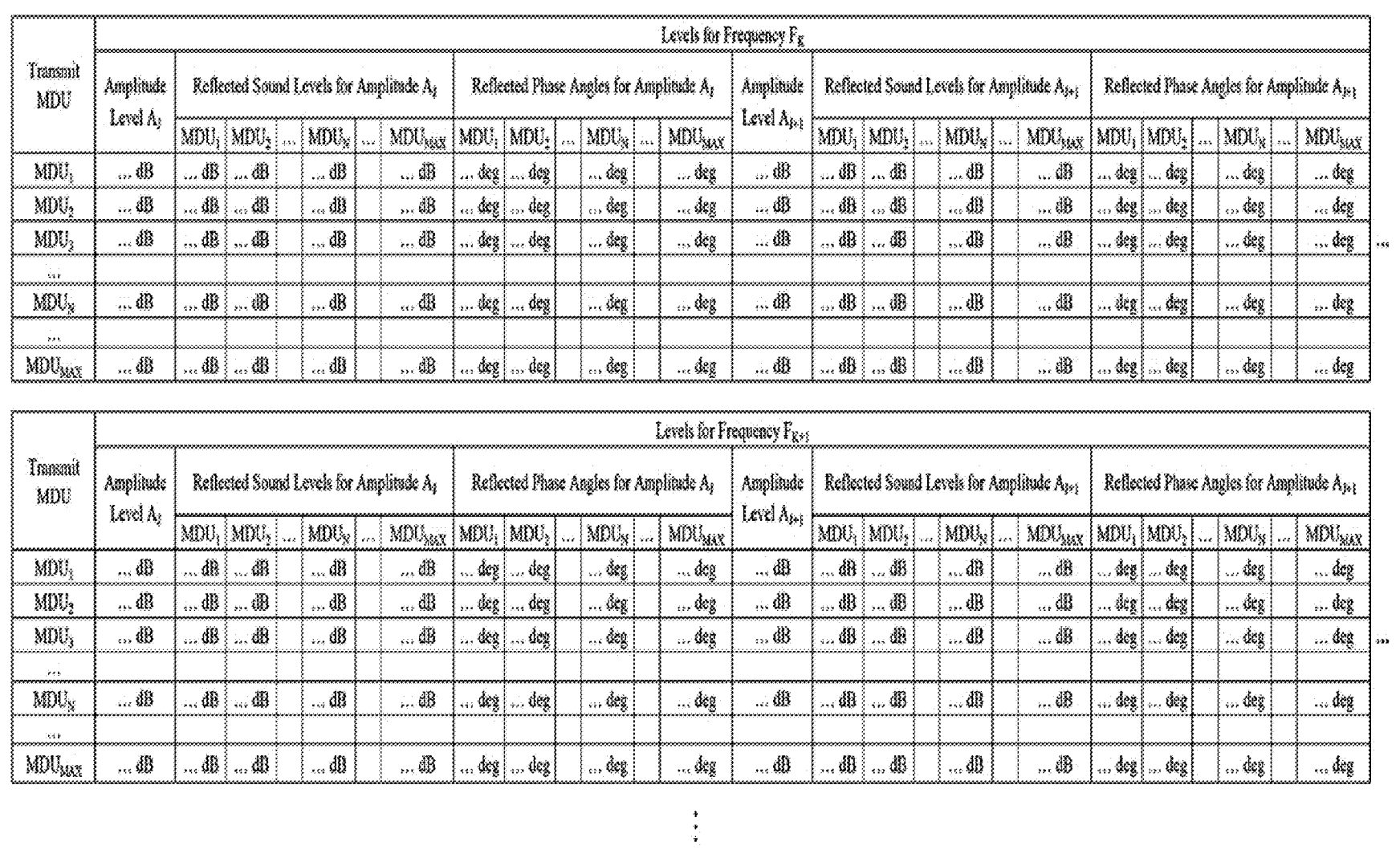

As shown in FIG. 8, the HEU 100 stores a database including data of the optimal sound output by each of the $MDU_N$ speaker 3106 associated with raw data of the reflected sounds captured by all MDU microphones 3105. In the example of FIG. 8, the sound level of the optimal sound output by the speaker 3106 of MDU1 is associated with the sound levels of the reflected sounds detected by the microphones 3105 of $MDU_1$, $MDU_2$, . . . , $MDU_N$, . . . . Likewise, the sound level of the optimal sound output from MDUN is associated with the sound levels of the reflected sounds detected by the microphones 3105 of $MDU_1$, $MDU_2$, ..., $MDU_N$, .... The database of FIG. 8 may further include frequency phase profiles and frequencies of the optimal sound and the reflected sound of the optimal sound.

Turning back to step S107 of FIG. 7, if N reaches the maximum number, which is the number of MDUs 300 installed in the aircraft cabin, at step S109, the HEU 100 compares sound characteristics of the optimal sound with sound characteristics of each of the reflected sounds of the optimal sound. For example, the HEU 100 compares the optimal sound output from $MDU_1$ with each of the reflected sounds captured by $MDU_1$, $MDU_2$, ..., $MDU_N$, .... Likewise, the HEU 100 compares the optimal sound output from MDUN with each of the reflected sounds captured by $MDU_1$, $MDU_2$, ..., $MDU_N$, .... For example, the sound characteristics may be gain-frequency characteristics and phase-frequency characteristics between the optimal sound and the reflected sounds. The HEU 100 may map reflection characteristics of sounds output by a $MDU_N$ speaker 3106 and captured by each one of microphones 3105 in the MDUs 300 based on the comparison of the sound characteristics. For example, the reflection characteristics indicate how specific tones of sounds from the $MDU_N$ speaker 3106 reflect off obstructions (e.g., walls, seats, monuments in the aircraft cabin) In one or more embodiments, the reflection characteristics may include sound absorption characteristics. In one or more embodiments, the reflection characteristics may include a delay time. The delay time may be defined as the time between the generation of the optimal sound output by speaker 3106 and the detection of the reflected sound by microphone 3105.

At step S110, the HEU 100 creates a baseline sound map 1042 based on the reflection characteristics mapped to the MDUs 300. FIG. 8 is a diagram showing an example of the baseline sound map 1042 according to one or more embodiments of the present invention.

As shown in FIG. 8, for example, the baseline sound map 1042 indicates reflected sound levels, reflected phase angles, and delay time (not shown) for each amplitude level A at each frequency F. Each frequency F and each amplitude level A are indicated for each transmit MDU 300. The reflected sound levels and the reflected phase angles are indicated for each MDU 300 that receives the reflected sound.

At step S111, the CMS terminal 400 receives an input from the user and instructs the HEU 100 to initiate a sound intelligibility test. In the sound intelligibility test, test sounds including tones and announcements tuned/adjusted by the baseline sound map 1042 are output by all MDU speakers 3106.

At step S112, if the user determines that the test sounds output by the MDU speakers 3106 are not intelligible, the systems goes back to step S101, which means that the process needs to be repeated. On the other hand, if the test sounds are intelligible, the sound intelligibility test is completed at step S113.

At step S114, the HEU 100 stores the baseline sound map 1042 and all the tuning/adjustments made for each one of the MDU speakers 3106 based on the baseline sound map 1042.

At step S115, if the cabin layout has changed, step 101 is repeated. The cabin layout may be defined by the arrangement/locations of the MDUs 300 in the aircraft cabin stored in the baseline sound map 1042 as show in FIG. 9.

If the cabin layout has not changed at step S115, the acoustic tuning is completed.

Thus, according to one or more embodiments, the cabin system 1 includes a plurality of MDUs 300 and the HEU 100. Each of the plurality of MDUs 300 includes the speaker 3106 and the microphone 3105. The speaker 3106 of the $MDU_1$ 300 outputs a first transmitted sound in the cabin with ramped amplitudes and ramped frequencies. The microphones 3105 of the plurality of MDUs 300 capture the first reflected sounds of the first transmitted sound in the aircraft cabin. Transmitted sounds may travel directly from a sound source such as speaker 3106 to a sensor such as microphone 3105 and/or reflect off one or more objects while traveling from a sound source to a sensor. While the following material will focus on reflected sounds, it is understood that transmitted sounds may also be included. The plurality of MDUs 300 converts the first reflected analog sound to a first reflected digital sound and sends the raw data to the HEU 100.. This process is repeated sequentially for each of the speakers 3106 of the plurality of MDUs 300 (i.e. outputting a second transmitted sound on the MDU2 speaker 3106/ capturing second reflected sounds with all microphones 3105, outputting a third transmitted sound on $MDU_3$ speaker 3106/capturing third reflected sounds with all microphones 3105, and so on). The HEU 100 then compares each of the first sub-optimal reflected sounds with the stored optimal sound in order to adjust the necessary output gain and frequency phase of the first speaker 3106, then repeats the process for each of the plurality of speakers 3106 (i.e. HEU 100 compares each of the second sub-optimal reflected sounds with the stored optimal sound in order to adjust the necessary output gain and frequency phase of the second speaker 3106, and so on), and stores the results into the baseline sound map 1042.

According to one or more embodiments, the HEU 100 maps baseline sounds to locations of the MDUs 300 (speakers 3106). Each of the baseline sounds indicates sound reflection characteristics in each of the locations the MDUs 300 based on the comparisons between the transmitted sounds and each of the reflected sounds. The HEU 100 creates a baseline sound map 1042 in the aircraft cabin. The baseline sound map 1042 indicates the locations the MDUs 300 and the baseline sounds mapped to the locations the MDUs 300.

Figure 10:
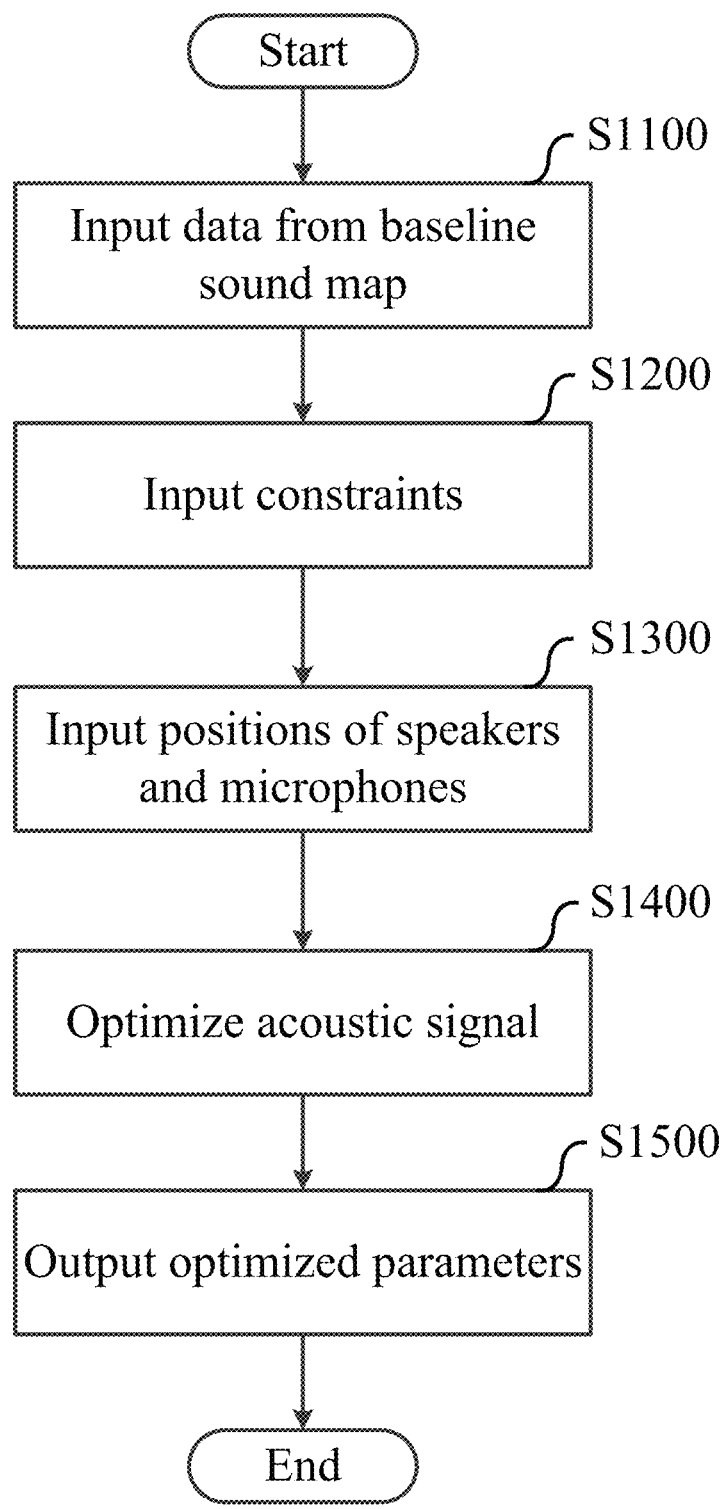
FIG. 10 shows a flowchart for optimizing the acoustic signal according to one or more embodiments.

FIG. 10 shows a flowchart for optimizing the acoustic signal according to one or more embodiments.

In step S1100, data from the baseline sound map 1042 may be input to a computer for processing. The computer may comprise a processor, memory, and storage. In one or more embodiments, the computer may be the HEU 100. The data may comprise reflected sound amplitudes as a function of optimal sound amplitude, sound source (speaker 3106 of $MDU_i$), sensor (microphone 3105 of $MDU_j$), and delay time.

In step S1200, constraints may be input for processing. Constraints may include minimum and maximum reflected sound amplitudes captured at each microphone 3105 and maximum driving signal (optimal sound level) for each speaker 3106. In one or more embodiments, the minimum reflected sound amplitude at each microphone 3105 may be determined by the speaker output gain map to ensure that the PA sound is sufficient for each passenger to hear over any background noise such as that from an engine. Thus, the minimum reflected sound amplitude may vary by phase of the flight. The maximum reflected sound amplitude may be set not to exceed a comfortable sound volume for each passenger. The maximum driving signal may be set according to the design of the speakers 3106 to ensure that the speakers are not damaged during operation. Further, one may constrain the speakers 3106 that are used by either setting the maximum driving signal to zero for the speakers not used or by excluding those speakers from the summation over the speakers in the superposition process.

Additional constraints may also be applied to achieve various desired outcomes. In one or more embodiments, the reflected sound amplitude at each microphone may vary as a function of frequency in order to produce a desirable sound. For example, it may be desirable to produce a flat response in which the response of each frequency is essentially the same.

In step S1300, the positions of the speakers 3106 and the microphones 3105 of the MDU's may be entered. Further, the passenger positions may be entered as well. It will be readily recognized that one may optimize the reflected sound at the passenger position rather than the microphone position.

In step S1400, the reflected sound signal at each microphone or passenger location may be optimized for clear communication over the PA given the stated constraints. Optimization may be done using Finite Element Analysis (FEA) or other optimization methods.

In step S1500, after carrying out the optimization, the optimized parameters may be output to HEU 100 to be stored in storage 104. These optimized parameters may include optimal sound gain as a function of frequency for each speaker 3106.

One or more embodiments of the invention provide a method of defining a speaker output gain map that requires calculating an output gain of each of the speakers 3106 during all phases of flight. The speaker output gain map may be created using the microphone 3105 on each MDU 300 to determine a location-specific gain of the MDU 300 in order to compensate the ambient noise generated by the engine and aerodynamic noise along each flight phase. For example, the flight phases may include before engine start, engine start, aircraft taxi, take-off, climb, cruise, descent, landing, and engine shutdown.

Figure 11:
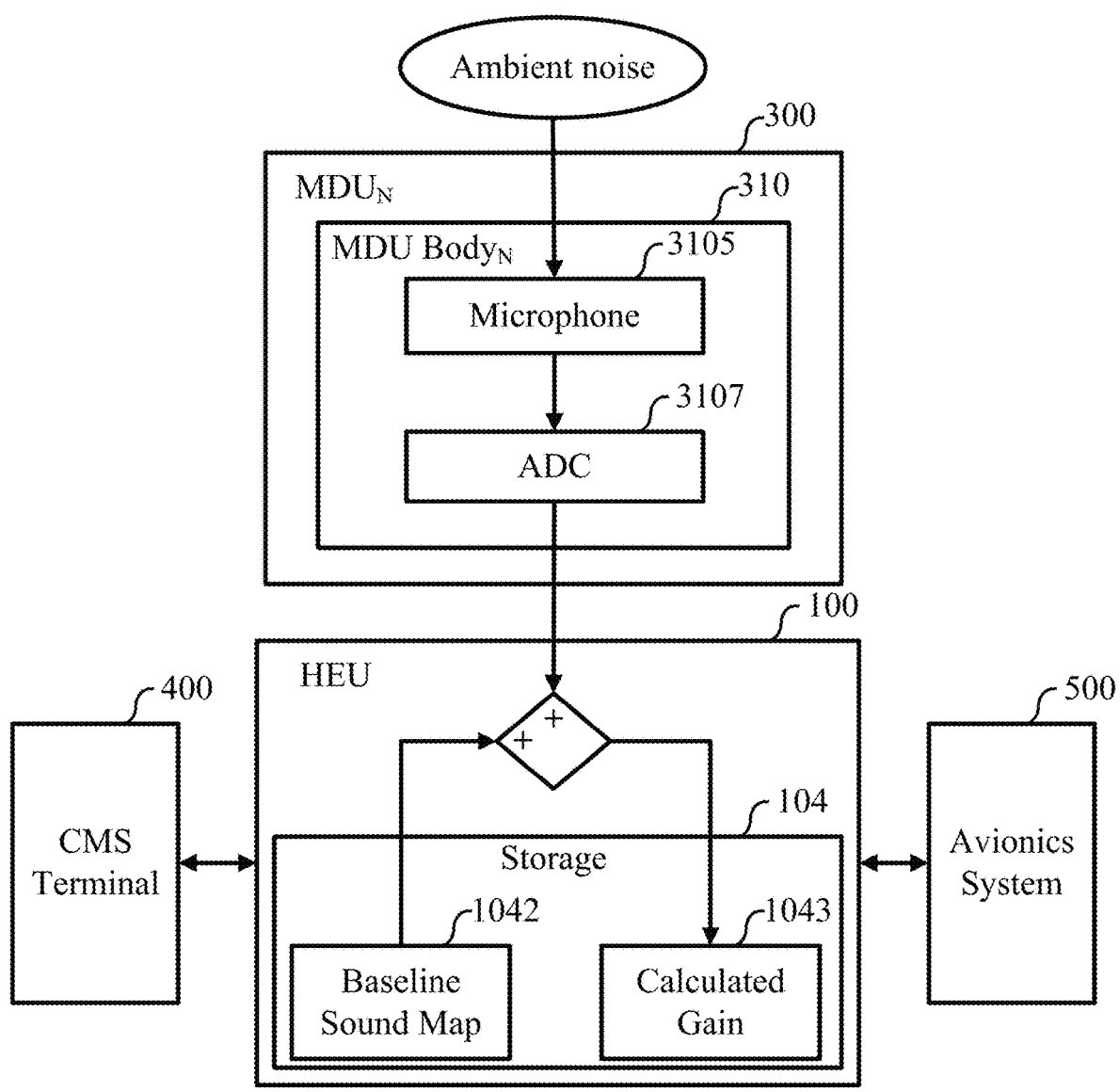
FIG. 11 shows a block diagram of operations to create a speaker output gain map according to one or more embodiments.

FIG. 11 shows a block diagram of operations to create a speaker output gain map according to one or more embodiments.

As shown in FIG. 11, the microphones 3105 of each MDU$_N$ 300 capture ambient noise in the aircraft cabin and convert the ambient noise into an electrical sound signal that is sent to the ADC 3107. The ADC 3107 converts the electrical sound signal to digital sound signals such as Ethernet digital signals, which is transmitted to the HEU 100.

The HEU 100 receives flight phase information indicating the current flight phase from the avionics system 500 continuously. For example, the avionics system 500 transmits the flight phase information at a predetermined period. As another example, the avionics system 500 transmits the flight phase information upon transition from one flight phase to another flight phase.

The HEU 100 calculates the output gain 1043 of each speaker 3106 based on the ambient noise captured by the microphone 3105 installed in the same MDU 300 during a flight phase, upon detection of the transition from one flight phase to another flight phase. Then, the HEU 100 stores the calculated output gain 1043 in its storage 104.

The output gain of each speaker 3106 may be calculated based on the gain defined on the baseline sound map 1042.

Figure 12:
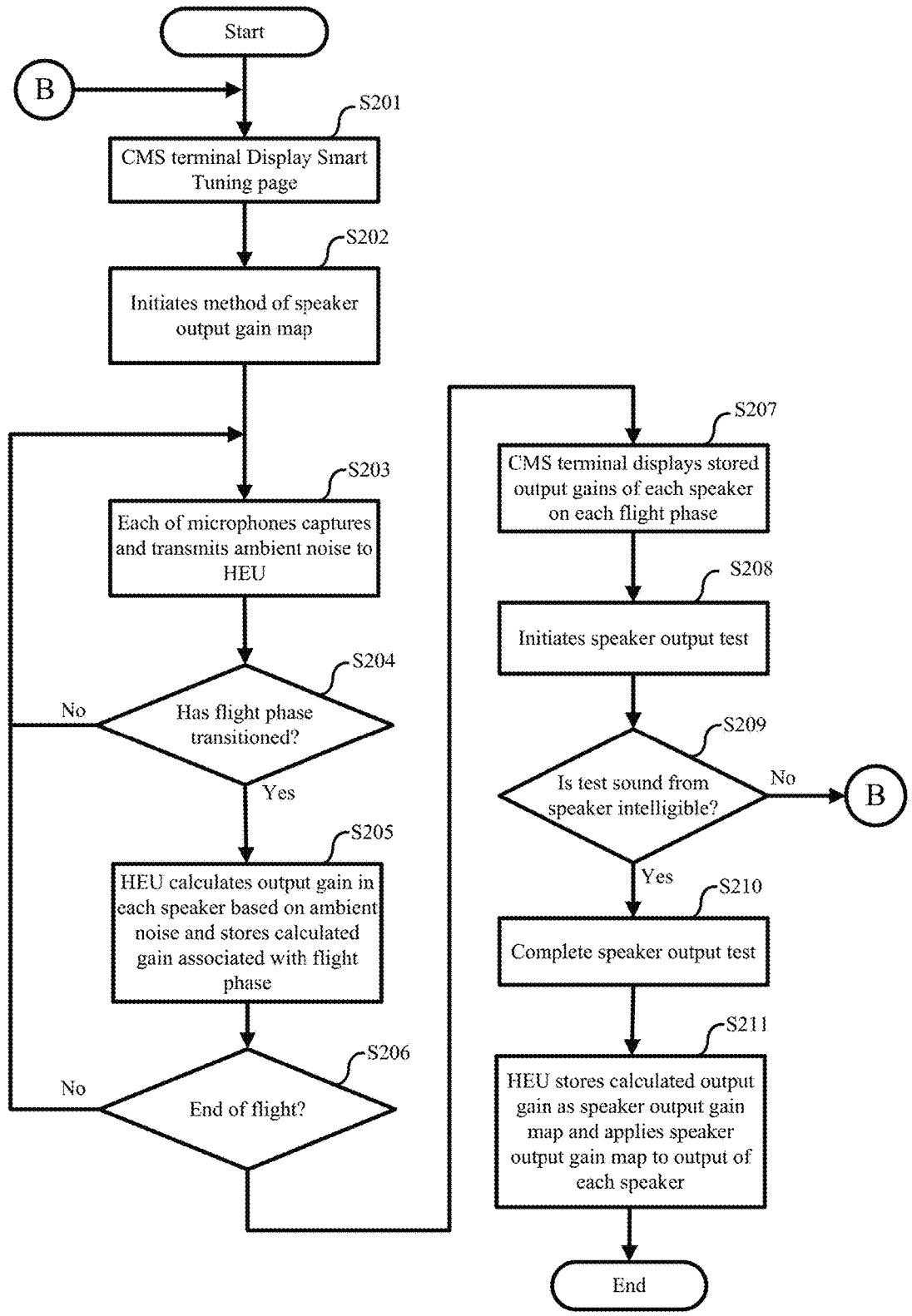
FIG. 12 shows a flowchart of a method for creating a speaker output gain map in the aircraft cabin system according to one or more embodiments.

FIG. 12 shows a flowchart of a method for creating a speaker output gain map in the aircraft cabin system according to one or more embodiments.

First, at step S201, the CMS terminal 400 receives an input from the user with superuser access rights and displays a Smart Tuning page used for creating a speaker output gain map.

At step S202, the CMS terminal 400 instructs the HEU 100 to initiate the method of creating the speaker output gain map based on an input from the user.

At step S203, the HEU 100 instructs each of the MDU microphones 3105 to capture ambient noise in the aircraft cabin. The MDU microphones 3105 convert the ambient noise into an electrical sound signal that is sent to the ADC 3107. The ADC 3107 converts the electrical sound signal to digital sound signals such as Ethernet digital signals and transmit the digital sound signals to the HEU 100.

The HEU 100 monitors the flight phase information provided by the avionics system 500. At step S204, the HEU 100 determines whether the flight phase transitioned. If the flight phase has not transitioned, step S203 is repeated.

On the other hand, if the HEU 100 detects that the flight phase has transitioned, at step S205, the HEU 100 calculates output gain of each of the speakers 3106 based on the noise level captured by the microphone 3105 installed in the same MDU 300, and stores the calculated gain map 1043 associated with the flight phase. The output gain may be calculated as a peak value, an average value, or weighted average value.

At step S206, the HEU 100 determines whether the flight has ended (e.g., the aircraft is parked). If the flight has not ended, step S203 is repeated. As such, the procedures of steps 5203 to 5205 are repeated during all phases of flight.

If the HEU 100 detects that the flight has ended at step S206, the CMS terminal 400 displays the stored output gain of each speaker 3106 on each flight phase at step S207.

At step S208, the CMS terminal 400 receives an input from the user and instructs the HEU 100 to initiate a speaker output test. In the speaker output test, test sounds consisting of tones and announcements with audio levels adjusted based on the dedicated calculated output gains are output by the speakers 3106.

At step S209, if the user determines that the test sounds from the speakers 3106 are not intelligible, step 201 is repeated. On the other hand, if the test sounds are intelligible, the speaker output test is completed at step S210.

At step S211, the HEU 100 stores the calculated output gains of each one of the speakers 3106 for each one of the flight phases as a speaker output gain map 1043 and applies tit to the output of each of the speakers 3106. FIG. 13 shows a speaker output gain map 1043 according to one or more embodiments. As shown in FIG. 13, in the speaker output gain map, each speaker 3106 of the MDU 300 is associated with the calculated output gain of the speaker 3106 and the flight phase (e.g., before takeoff, takeoff, . . . ).

As explained above, the methods of acoustic tuning according to one or more embodiments of the invention can eliminate the need to perform a manual acoustic tuning of the PA system. As a result, the engineering time and effort required to certify the system can be drastically reduced. Furthermore, the methods of acoustic tuning according to one or more embodiments of the invention can eliminate the need for any special instrumentation or trained personnel required to perform the audio tuning.

According to one or more embodiments, following ground and flight tests of the aircraft, the profiles such as the baseline sound map 1042 and the speaker output gain map 1043 are securely stored in the HEU 100 as non-modifiable and non-configurable files. These profiles are applied dynamically by the HEU 100 during the course of any flight to provide an intelligible PA sound. These profiles are also used for certifying the cabin intelligibility per the required certification regulations.

According to one or more embodiments, the method of acoustic tuning in the aircraft cabin includes (1) the definition of a baseline sound map, which includes outputting, with a first speaker among a plurality of speakers in different locations on an aircraft cabin, a first sound with ramped amplitudes and ramped frequencies stored in a server; capturing, with a plurality of microphones in different locations of the cabin, first reflected sounds of the first sound, and storing the data in the same server; repeating the process sequentially for each of the plurality of speakers (i.e. outputting a second sound on the second speaker/capturing second reflected sounds, outputting a third sound on the third speaker/capturing third reflected sounds, and so on); comparing with the server, the first sound with each of the recorded first reflected sounds to adjust an output gain and frequency phase of the first speaker; and repeating the process with the corresponding data for each of the plurality of speakers (i.e. comparing the second sound with the recorded second reflected sounds to adjust an output gain and frequency phase of the second speaker, comparing the third sound with the recorded third reflected sounds to adjust an output gain and frequency phase of the third speaker, and so on). (2) The definition of a speaker output gain map (calculated gain map), which includes capturing, with a plurality of microphones installed in different locations of the aircraft cabin, the ambient noise corresponding to the location of each of a plurality of speakers installed in different locations of the aircraft cabin during a first phase of flight and storing the data in the same server as the baseline sound map; comparing with the server, the baseline sound map data with the ambient noise level captured by each of the plurality of microphones during the first phase of flight, to define a gain for each of the plurality of speakers for the first phase of flight; repeating the process sequentially for each of the different phases of flight; and recording the data in a speaker output gain map.

Although the disclosure has been described with respect to only a limited number of embodiments, those skilled in the art, having benefit of this disclosure, will appreciate that various other embodiments may be devised without departing from the scope. Accordingly, the scope of the invention should be limited only by the attached claims.

What is claimed is:

1. A method of acoustic tuning in an aircraft cabin, the method comprising:
   outputting, with a first speaker among a plurality of speakers in different locations on an aircraft cabin, a first sound;
   detecting, with a plurality of microphones in different locations of the aircraft cabin, first reflected sounds of the first sound in the aircraft cabin;
   after the first speaker outputs the first sound, outputting, with a second speaker among the plurality of speakers, a second sound;
   detecting, with the plurality of microphones, second reflected sounds of the second sound;
   comparing, with a server connected to the plurality of speakers and the plurality of microphones, the first sound and the second sound with each of the first reflected sounds and each of the second reflected sounds, respectively;
   adjusting, with the server, an output gain and frequency phase of each of the plurality of speakers based on the comparisons between the first sound and each of the first reflected sounds and between the second sound and each of the second reflected sounds,
   mapping, with the server, baseline sounds to the locations of the plurality of microphones; and
   creating, with the server, a baseline sound map in the aircraft cabin based on the baseline sounds, wherein
   each of the baseline sounds corresponds to sound reflection characteristics in each of the locations determined based on the comparisons,
   the baseline sound map comprises aircraft cabin zone information that corresponds to zones of the aircraft cabin, the locations of the plurality of microphones, and the sound reflection characteristics, and
   in the baseline sound map, the sound reflection characteristics are mapped to the locations of the plurality of microphones and each of the locations of the plurality of microphones correspond to a specific location within each of the zones of the aircraft cabin.

2. The method according to claim 1, wherein the aircraft cabin system comprises a modular display that comprises each of the plurality of speakers and each of the plurality of microphones.

3. The method according to claim 1, further comprising:
   sequentially outputting sounds with the plurality of speakers; and
   detecting, with the plurality of microphones, reflected sounds of the sounds in the aircraft cabin;
   comparing, with the server, the sounds with the reflected sounds, respectively, in each of the plurality of microphones; and
   adjusting, with the server, an output gain and a frequency phase of each of the plurality of speakers based on the comparisons between the sound and the reflected sounds.

4. The method according to claim 1, further comprising:
   outputting, from the server to the first speaker, a first ramp amplitude and a first ramp frequency; and
   outputting, from the server to the second speaker, a second ramp amplitude and a second ramp frequency,
   wherein the first speaker outputs the first sound based on the first ramp amplitude and the first ramp frequency, and
   wherein the second speaker outputs the first sound based on the second ramp amplitude and the second ramp frequency.

5. The method according to claim 1, further comprising:
   capturing, with a first microphone among the plurality of microphones, ambient noise in the aircraft cabin during a first flight phase;
   detecting, with the server, transition from the first flight phase to a second flight phase, and
   calculating, with the server, an output gain of the first speaker based on the ambient noises detected in the first flight phase upon the detection of the transition,
   wherein the first microphone and the first speaker are included in a modular display.

6. The method according to claim 1, further comprising:
   capturing, with the plurality of microphones, ambient noises in the aircraft cabin in a first flight phase;
   detecting, with the server, transition from the first flight phase to a second flight phase, and
   calculating, with the server, an output gain of each of the plurality of speakers based on the ambient noises detected in the first flight phase upon the detection of the transition, wherein each of the plurality of microphones and each of the plurality of speakers are included in a modular display.

7. The method according to claim 6, further comprising:
mapping, with the server, the output gain of each of the plurality of speakers corresponding to each of the locations of the plurality of microphones.

8. The method according to claim 7, further comprising:
creating, with the server, a speaker output gain map in the aircraft cabin,
wherein the speaker output gain map indicates the locations and the output gain mapped to the locations.

9. The method according to claim 1, further comprising repeating the outputting of sound and the detecting of reflected sounds sequentially for each of the plurality of speakers.

10. The method according to claim 4, further comprising repeating the outputting of ramp amplitudes and ramp frequencies.

11. A method of acoustic tuning in an aircraft cabin, the method comprising:
outputting, with a first speaker among a plurality of speakers in different locations on an aircraft cabin, a first sound;
detecting, with a plurality of microphones in different locations of the aircraft cabin, first reflected sounds of the first sound in the aircraft cabin;
after the first speaker outputs the first sound, outputting, with a second speaker among the plurality of speakers, a second sound;
detecting, with the plurality of microphones, second reflected sounds of the second sound;
comparing, with a server connected to the plurality of speakers and the plurality of microphones, the first sound with each of the first reflected sounds to adjust an output gain and frequency phase of the first speaker;
comparing, with the server, the second sound with each of the second reflected sounds to adjust an output gain and frequency phase of the second speaker;

mapping, with the server, baseline sounds to the locations of the plurality of microphones, wherein each of the baseline sounds corresponds to sound reflection characteristics in each of the locations determined based on the comparisons;
creating, with the server, a baseline sound map comprising aircraft cabin zone information that corresponds to zones of the aircraft cabin, the locations of the plurality of microphones, and the sound reflection characteristics;
capturing, with the plurality of microphones, ambient noises in the aircraft cabin during a first phase of flight;
calculating, with the server, an output gain of the first speaker based on the ambient noises, wherein
the first microphone and the first speaker are included in a modular display, and
in the baseline sound map, the sound reflection characteristics are mapped to the locations of the plurality of microphones and each of the locations of the plurality of microphones correspond to a specific location within each of the zones of the aircraft cabin.

12. The method according to claim 11, further comprising:
outputting, from the server to the first speaker, the first sound with ramped amplitude and ramped frequency; and
outputting, from the server to the second speaker, the second sound with ramped amplitude and ramped frequency,
wherein the outputting outputs the first sound based on the first sound with ramped amplitude and ramped frequency,
wherein the outputting outputs the first sound based on the second sound with ramped amplitude and ramped frequency, and
repeating the outputting of sounds with ramped amplitude and ramped frequency sequentially for each of the plurality of speakers.

\* \* \* \* \*